(12) United States Patent
Renn et al.

(10) Patent No.: US 11,511,812 B2
(45) Date of Patent: *Nov. 29, 2022

(54) VEHICLE FRONT END ASSEMBLY

(71) Applicants: Nissan North America, Inc., Franklin, TN (US); NISSAN MOTOR CO., LTD., Yokohama (JP)

(72) Inventors: Jordan Renn, Royal Oak, MI (US); Masayuki Kato, Kanagawa (JP); David Coakley, Macomb, MI (US); Yasutsune Terashima, Novi, MI (US); Shuichi Okada, Kanagawa (JP); Syu Hashimoto, Tokyo (JP)

(73) Assignee: NISSAN NORTH AMERICA, INC., Franklin, TN (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/035,523

(22) Filed: Sep. 28, 2020

(65) Prior Publication Data

US 2022/0097771 A1    Mar. 31, 2022

(51) Int. Cl.
| | |
|---|---|
| *B62D 25/08* | (2006.01) |
| *B62D 25/14* | (2006.01) |
| *B62D 21/11* | (2006.01) |
| *B62D 21/15* | (2006.01) |
| *B62D 25/10* | (2006.01) |

(Continued)

(52) U.S. Cl.
CPC ............ *B62D 25/085* (2013.01); *B60R 19/24* (2013.01); *B62D 21/11* (2013.01); *B62D 21/152* (2013.01); *B62D 25/10* (2013.01); *B62D 25/14* (2013.01); *B62D 27/02* (2013.01); *B60R 9/02* (2013.01); *B62D 25/082* (2013.01); *B62D 27/065* (2013.01)

(58) Field of Classification Search
CPC ...... B62D 25/08; B62D 21/11; B62D 21/152; B62D 25/10; B62D 25/14; B62D 27/02; B62D 25/082; B62D 27/065; B62D 25/085; B60R 19/24; B60R 19/02
USPC ..................................................... 296/193.09
See application file for complete search history.

(56) References Cited

U.S. PATENT DOCUMENTS

| | | |
|---|---|---|
| 6,994,374 B2 | 2/2006 | Miyasaka |
| 7,819,218 B2 | 10/2010 | Eichberger et al. |

(Continued)

FOREIGN PATENT DOCUMENTS

EP         1612126 A1      1/2006

*Primary Examiner* — D Glenn Dayoan
*Assistant Examiner* — Dana D Ivey
(74) *Attorney, Agent, or Firm* — Global IP Counselors, LLP

(57) ABSTRACT

A vehicle frame structure has a front side member that extends forward from a dashwall. An engine cradle is attached to the front side member with a lateral side portion of the engine cradle being located beneath and spaced apart from a lower surface of the front side member. An engine is installed to the engine cradle with a portion of the engine extending upward from the engine cradle adjacent to the inboard surface of the front side member. An inboard push structure has an inboard surface, an upper portion and a lower portion. The upper portion is attached to an inboard surface of the front side member. The lower portion extends downward below a lower surface of the front side member. The inboard surface faces the engine proximate the lateral portion of the lateral side portion of the engine cradle.

18 Claims, 9 Drawing Sheets

(51) Int. Cl.
  *B62D 7/02* (2006.01)
  *B60R 19/24* (2006.01)
  *B62D 27/02* (2006.01)
  *B60R 9/02* (2006.01)
  *B62D 27/06* (2006.01)

(56) References Cited

U.S. PATENT DOCUMENTS

| | | |
|---|---|---|
| 8,544,589 B1 | 10/2013 | Rupp et al. |
| 8,596,711 B2 * | 12/2013 | Yasui .................. B62D 25/082 |
| | | 296/187.1 |
| 8,807,632 B2 | 8/2014 | Ramoutar et al. |
| 9,016,768 B2 | 4/2015 | Makino et al. |
| 9,180,915 B2 | 11/2015 | Kim |
| 9,233,714 B2 | 1/2016 | Hara |
| 9,272,678 B2 | 3/2016 | Nam et al. |
| 9,272,679 B1 | 3/2016 | Ramoutar et al. |
| 9,290,138 B2 | 3/2016 | Muraji et al. |
| 9,376,144 B2 * | 6/2016 | Shaner .................. B62D 21/152 |
| 9,421,865 B2 | 8/2016 | Bernardi et al. |
| 9,550,463 B2 | 1/2017 | Hara et al. |
| 9,555,754 B2 | 1/2017 | Hara |
| 9,555,756 B2 | 1/2017 | Sugano et al. |
| 9,849,914 B2 | 12/2017 | Elliott et al. |
| 9,981,694 B2 | 5/2018 | Sekiguchi et al. |
| 10,059,288 B2 | 8/2018 | Canobbio et al. |
| 10,279,841 B2 | 5/2019 | Ito et al. |
| 10,286,960 B2 | 5/2019 | Kagami et al. |
| 10,501,035 B2 | 12/2019 | Gupta et al. |
| 10,526,015 B2 | 1/2020 | Nishikawa et al. |
| 2009/0302591 A1 | 12/2009 | Auer et al. |
| 2014/0062129 A1 | 3/2014 | Syed et al. |
| 2014/0361560 A1 | 12/2014 | Sakakibara et al. |
| 2015/0251702 A1 | 9/2015 | Volz et al. |
| 2016/0121932 A1 | 5/2016 | Suzuki et al. |
| 2017/0021868 A1 | 1/2017 | Watanabe et al. |
| 2017/0113735 A1 | 4/2017 | Kawabe et al. |
| 2018/0065669 A1 | 3/2018 | Ghislieri et al. |

\* cited by examiner

VEHICLE FRONT END ASSEMBLY

BACKGROUND

Field of the Invention

The present invention generally relates to a vehicle front end assembly. More specifically, the present invention relates to a vehicle front end assembly that includes an inboard push structure attached to an inboard surface of a front side member that is structured to transmit to an engine at least a portion of impact forces received during an impact event.

Background Information

Many vehicle structures are being provided with structures installed to a front side member of a vehicle that are positioned and dimensioned to receive impact forces during an impact event.

SUMMARY

One object of the present disclosure is to provide a vehicle body structure with an inboard push structure attached to an inboard surface of a front side member that is structured to transmit to an engine at least a portion of impact forces received during an impact event.

In view of the state of the known technology, one aspect of the present disclosure is to provide a vehicle front end assembly with a vehicle frame structure, an engine cradle, an engine and an inboard push structure. The vehicle frame structure has a front side member and a dashwall. The front side member extends forward from the dashwall. A passenger compartment is defined rearward of the dashwall. The front side member has a front end surface, an upper surface, a lower surface, an inboard surface that extends from the upper surface to the lower surface and an outboard surface that extends from the upper surface to the lower surface. The engine cradle is attached to the front side member with a lateral side portion of the engine cradle being located beneath and spaced apart from the lower surface of the front side member. The engine is installed to the engine cradle with a portion of the engine extending upward from the engine cradle adjacent to the inboard surface of the front side member. The inboard push structure has an inboard surface, an upper portion and a lower portion. The upper portion is attached to the inboard surface of the front side member. The lower portion extends downward below the lower surface of the front side member. The inboard surface faces the engine proximate the lateral portion of the lateral side portion of the engine cradle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
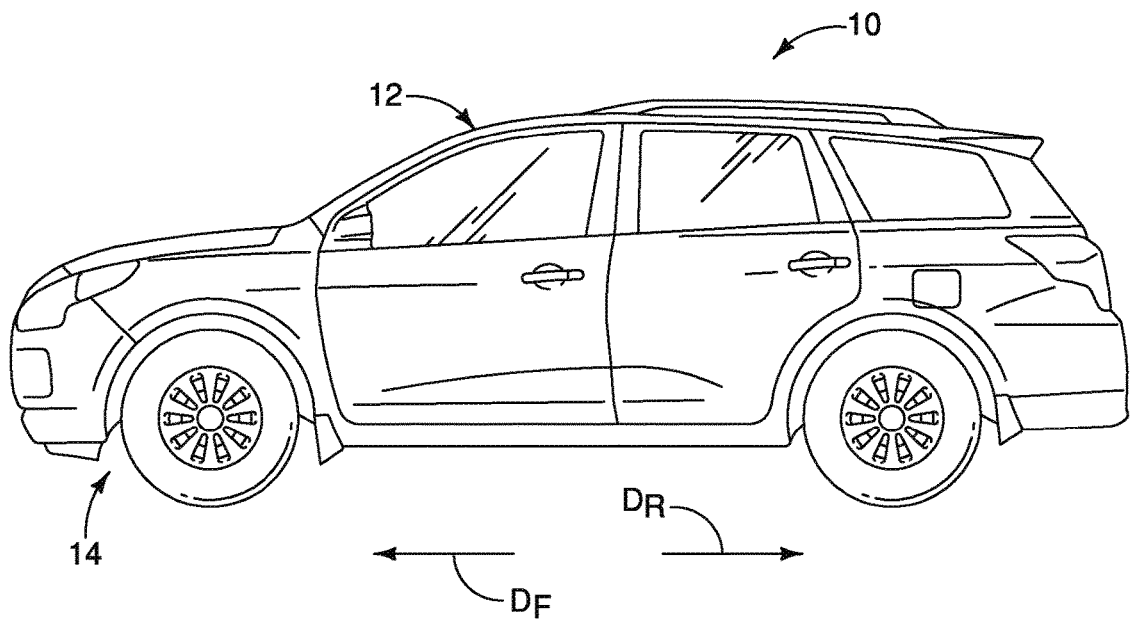
FIG. 1 is a side view of a vehicle that includes a vehicle body structure with a front end assembly in accordance with an exemplary embodiment.

Referring initially to FIG. 1, a vehicle 10 is illustrated in accordance with a first embodiment.

Figure 2:
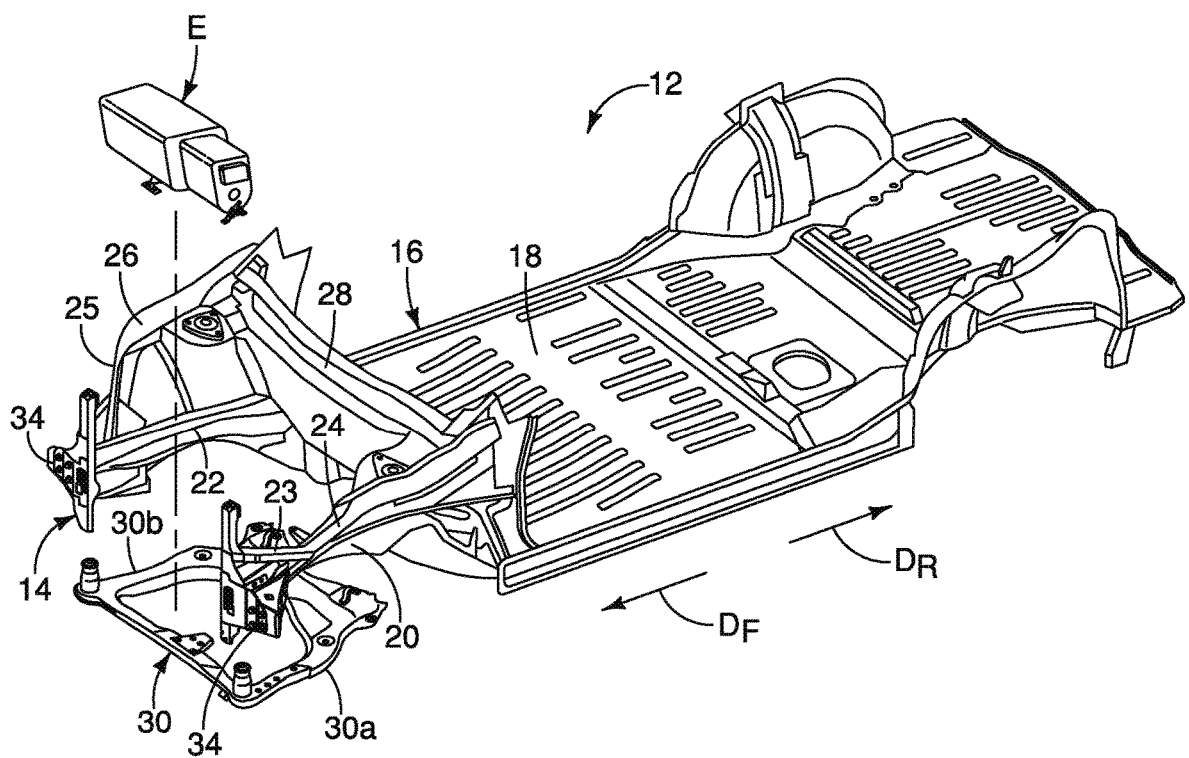
FIG. 2 is a perspective view of a portion of the vehicle body structure including a floor structure, a portion of the front end assembly, an engine cradle and an engine or power plant in accordance with the exemplary embodiment.

The vehicle 10 includes a vehicle body structure 12 and a vehicle front end assembly 14. The vehicle body structure 14 includes a frame structure 16 shown in FIG. 2 separated from the remainder of the vehicle body structure 12. The frame structure 16 includes a floor panel 18 that at least partially defines a passenger compartment and frame elements forward of the passenger compartment and further includes a first front side member 20, a second front side member 22, a first hood ledge 24, a second hood ledge 26 and a dashwall 28. The first and second front side members 20 and 22 extend in a vehicle forward direction $D_F$ from the dashwall 28 and the floor panel 18 extends in a rearward direction $D_R$ from the dashwall 28. A brace 25 has a rearward end attached to the hood ledges 24 and 26 at a location above and spaced apart from the front side members 20 and 22.

An engine compartment is at least partially defined by between the first and second front side members 20 and 22, and between the first and second hood ledges 24 and 26 forward of the dashwall 28. The dashwall 26 separates the passenger compartment from and engine compartment.

The vehicle body structure 12 further includes an engine cradle 30 that is installed to the first and second front side members 20 and 22 and is located below the first and second front side members 20 and 22. An engine E is installed to the engine cradle 30 in a conventional manner.

The vehicle front end assembly 14, as defined herein, includes the first and second from side members 20 and 22, the first and second hood ledges 24 and 26, the engine cradle 30, a bumper assembly 32 (see FIGS. 3-5 and 9), push-off structures 34 (also referred to hereinbelow as outboard push-off structures 34 and shown in FIGS. 3-7, 9 and 15-18) and/or inboard push structures 36 (see FIGS. 9-15 and 18). The first and second hood ledges 24 and 26 and the engine cradle 30 are optional and not required in all configurations and embodiments of the vehicle front end assembly 14. It should be understood from the drawings and the description herein below that the vehicle front end assembly 14 can include: both the outboard push-off structures 34 and the inboard push structures 36; just the outboard push-off structures 34; or just the inboard push structures 36.

The outboard push-off structures 34 and the inboard push structures 36 are configured such that there is one outboard push-off structure 34 on the first front side member 20 and one outboard push-off structure 34 on the second front side member 22. Similarly, the inboard push structures 36 are configured such there is one inboard push structures 36 on the first front side member 20 and one inboard push structures 36 on the second front side member 22. Since the two outboard push-off structures 34 are identical (except for their being symmetrical mirror images of one another) and the two inboard push structures 36 are identical (except for their being symmetrical mirror images of one another), only the outboard push-off structure 34 and the inboard push structure 36 installed to the first front side member 20 are described herein below and fully depicted in the drawings, for the sake of brevity.

As shown in FIGS. 2-3, 5 and 8-9, the first front side member 20 (hereinafter referred to as the front side member 20) has a front end surface 40, an upper surface 42, a lower surface 44, an inboard surface 46 and an outboard surface 48. The inboard surface 46 and the outboard surface 48 extend from the upper surface 42 to the lower surface 44 and from the front end surface 40 to the dashwall 28.

A rearward end of the first hood ledge 24 is attached to dashwall 28 at a location spaced apart from and vertically higher than the front side member 20. The first hood ledge 24 curves in an inboard and downward direction moving forward such that a front end of the first hood ledge 24 attaches to the outboard surface 48 of the front side member forward of the dashwall 28 and rearward of the front end surface 40 of the front side member 20. In other words, the hood ledge 24 extends upward, rearward and outboard from the front side member 20 proximate the front end surface 40 toward the upper portion of the dashwall 28.

The engine cradle 30 is attached to the front side member 20 and the front side member 22. The engine cradle 30 include four attachment structures that are fixed to the lower surface 44 of both of the front side members 20 and 22 in a conventional manner. Further, lateral side portions 30a and 30b of the engine cradle 30 are located beneath and spaced apart from respective lower surfaces 44 of the front side members 20 and 22.

The engine E is installed to the engine cradle 30 and extend upward therefrom between respective inboard surfaces 46 of the front side members 20 and 22. The engine E can be an internal combustion engine that includes a transmission, an electric motor, (with the vehicle 10 being an electric vehicle), or can be a hybrid power plant that includes both an electric motor and an internal combustion engine.

The bumper assembly 32 includes a pair of a bumper stays 50 (only one bumper stay is shown) and a front bracket 52. The bumper stays 50 are installed to respective opposite outboard ends of the front bracket of the bumper assembly 32, as shown in FIGS. 3-5 and 9. The bumper stays 50 are supported by the front side members 20 and 22, as described in greater detail below.

A description of one of the outboard push-off structures 34 (also referred to as the push-off structure 34) is now provided with specific reference to FIGS. 3-7, 9 and 15-18. The push-off structure 34 attached to the outboard surface 48 of the front side member 20 adjacent to the front end surface 40 of the front side member 20, as is described further detail below. An upper portion of the push-off structure 34 extends outboard from the outboard surface 48 and a lower portion of the push-off structure 34 extends downward below the lower surface 44 of the front side member 20 toward the lateral portion 30a of the engine cradle 30 and the engine E.

Figure 7:
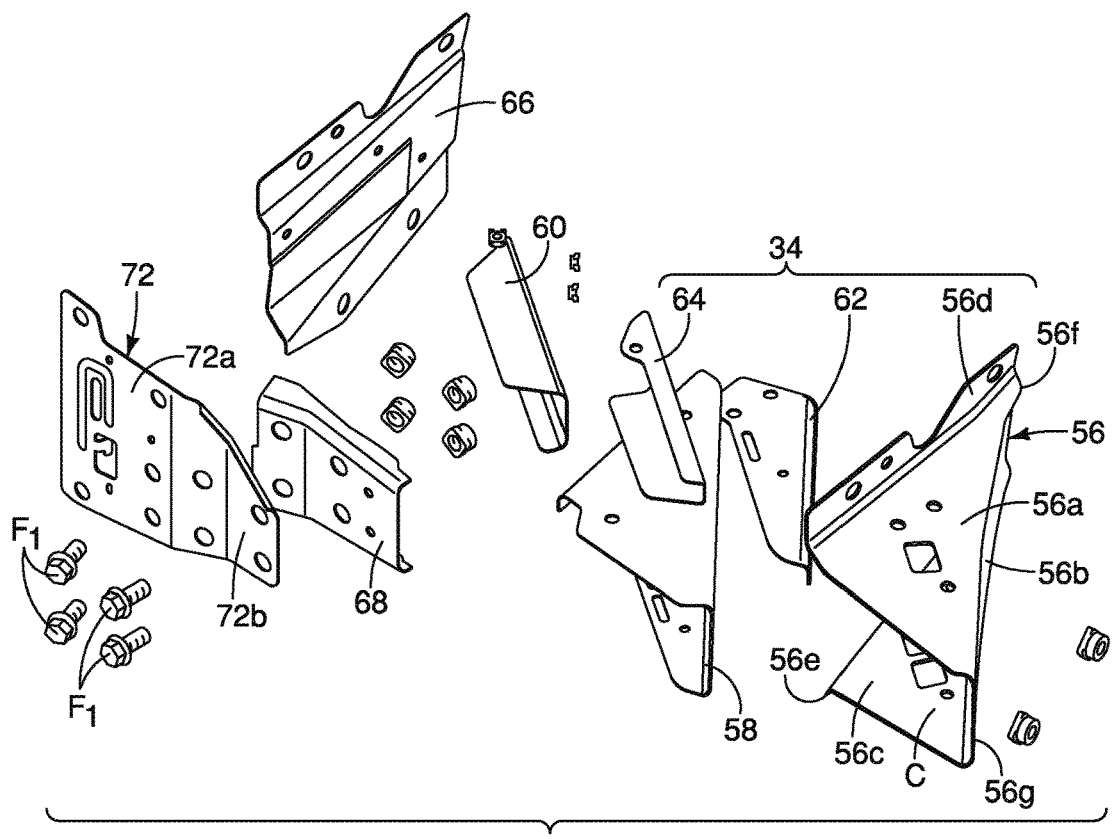
FIG. 7 is an exploded perspective view of the push-off structure and the front bracket thereof shown removed from the vehicle body structure of the vehicle in accordance with the exemplary embodiment.
Figure 8:
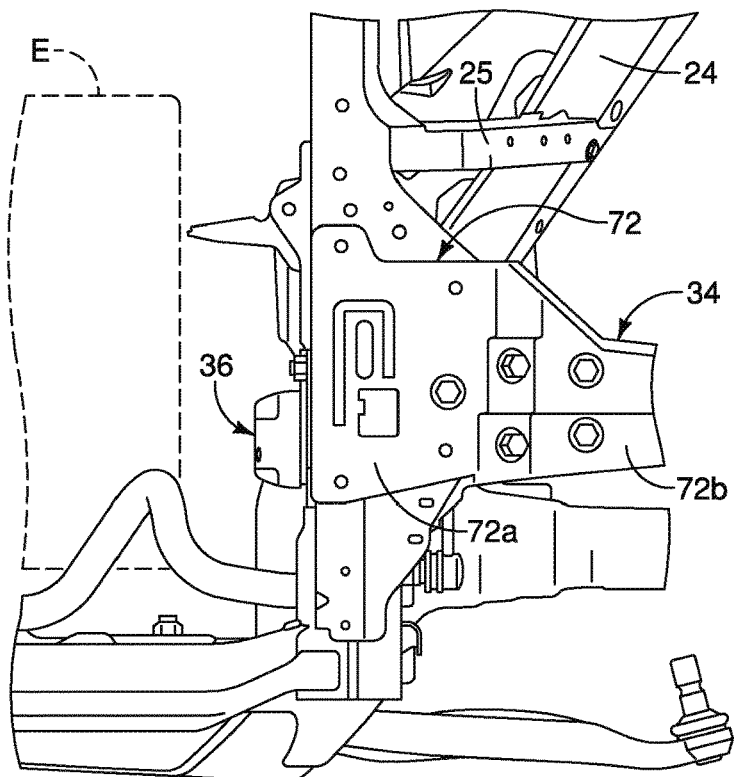
FIG. 8 is a front view of the front end assembly showing the front bracket attached to the push-off structure and the front side member and the inboard push structure attached to an inboard surface of the front side member in accordance with the exemplary embodiment.

The push-off structure 34 is formed from a plurality of plates and/or panels that are welded to one another. More specifically as shown in FIG. 7, the push-off structure 34 includes an outboard bracket 56, a lower main bracket 58, a lower reinforcement bracket 60, a first upper bracket 62, a second upper bracket 64, an inboard bracket 66 and a forward bracket 68.

The largest of the plurality of plates and/or panels of the push-off structure 34 is the outboard bracket 56. The outboard bracket 56 has an upper section 56a, an outboard section 56b and a lower section 56c. The upper section 56a, the outboard section 56b and the lower section 56c at least partially define a cavity therein. The upper section 56a includes an upper flange 56d that attaches to the outboard surface 48 of the front side member 20. The lower section 56c includes a lower flange 56e that can attach to the inboard push structure 36, when the inboard push structure 36 is employed, in a manner described in greater detail below.

Figure 15:
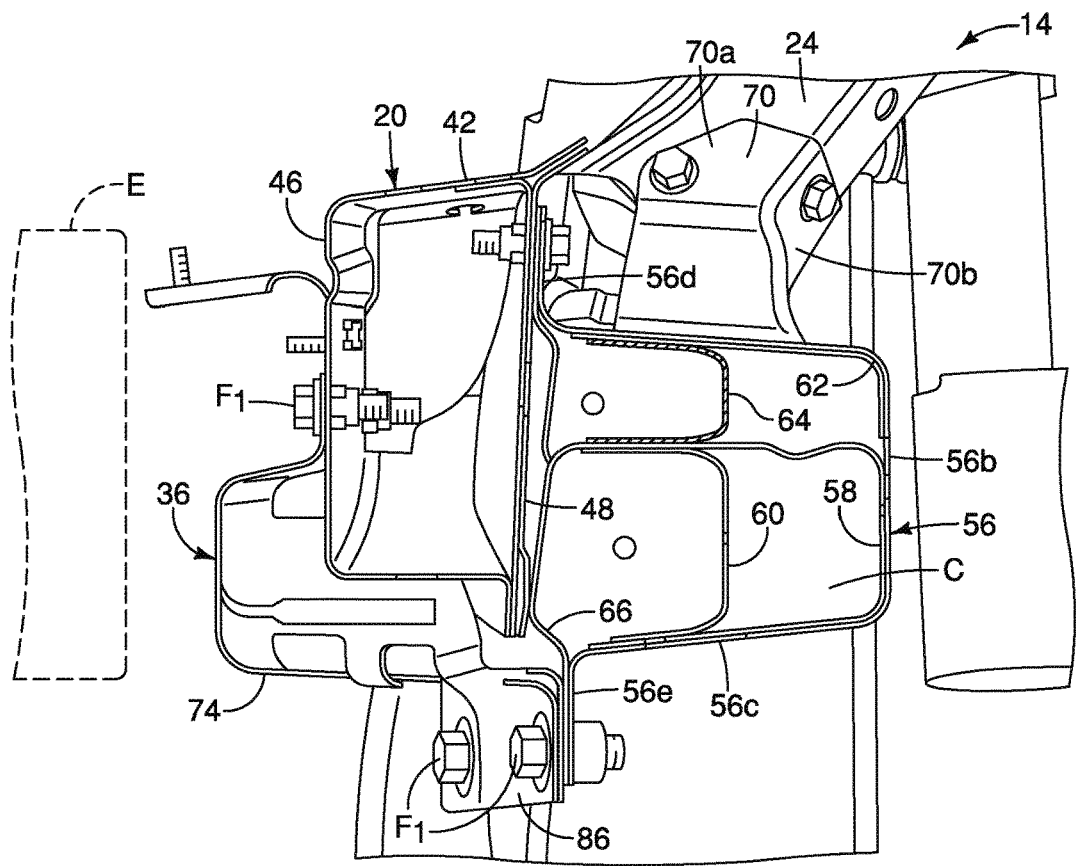
FIG. 15 is a cross-sectional view taken along the line 15-15 in FIG. 12 showing the various brackets of the push-off structure welded to one another defining a honeycomb-like or labyrinth-like internal assembly of the push-off structure within a cavity defined by an outboard bracket of the push-off structure, and, the inboard push structure in accordance with the exemplary embodiment.
Figure 16:
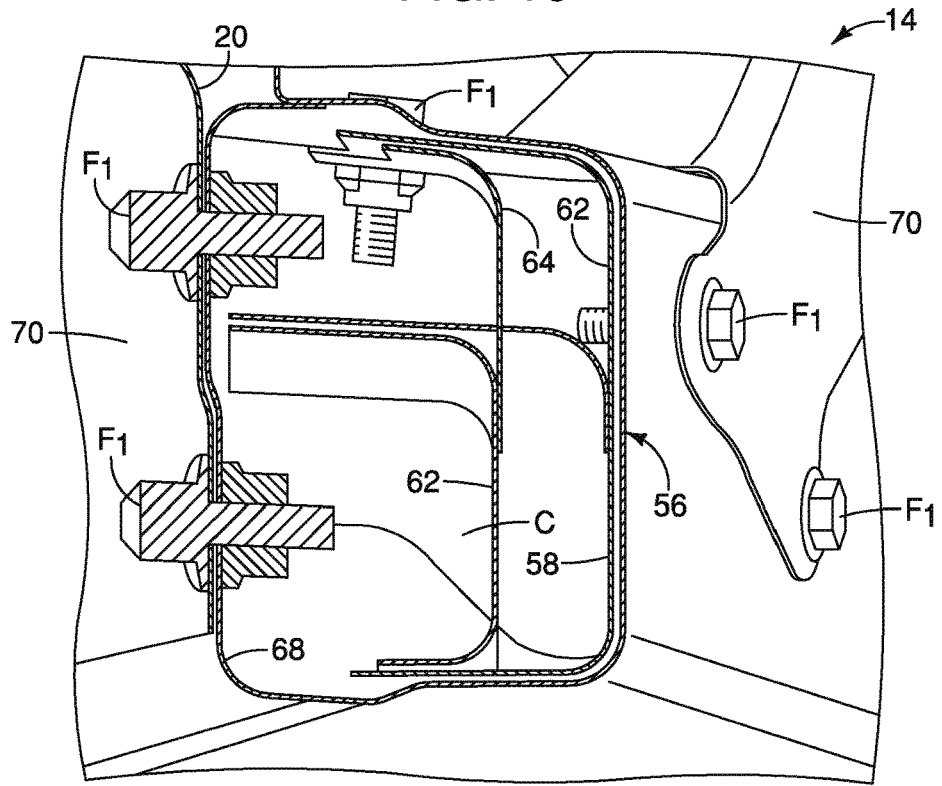
FIG. 16 is another cross-sectional view taken along the line 16-16 in FIG. 12 showing further details of the various brackets of the push-off structure in accordance with the exemplary embodiment.
Figure 17:
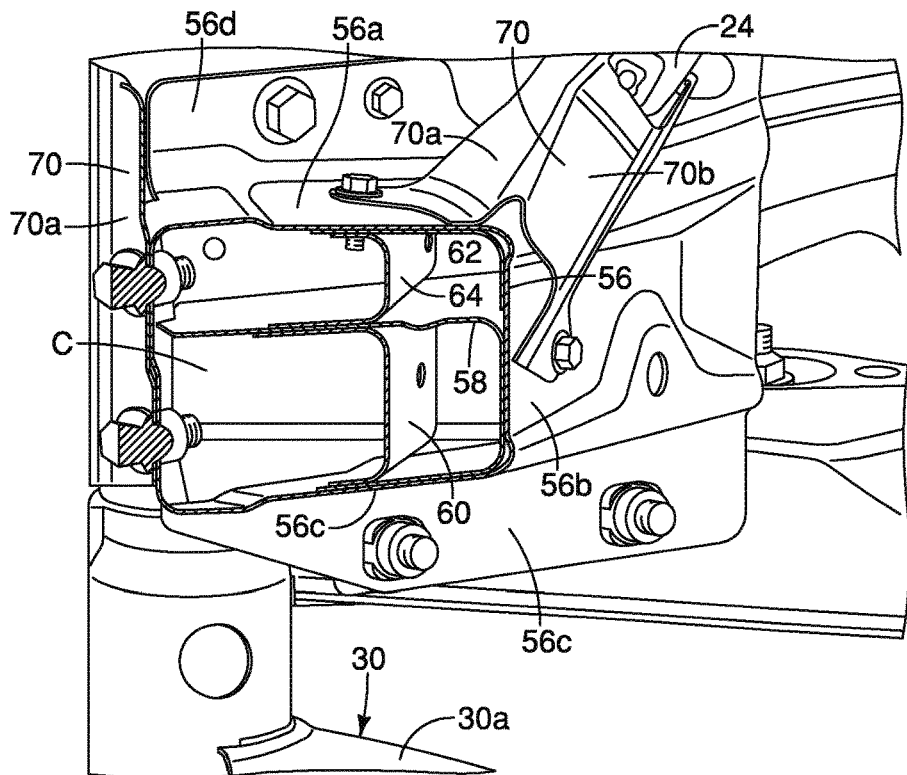
FIG. 17 is still another cross-sectional view taken along the line 17-17 in FIG. 12 showing further details of the various brackets of the push-off structure in accordance with the exemplary embodiment.

When the push-off structure 34 is fully assembled, the lower main bracket 58, the lower reinforcement bracket 60, the first upper bracket 62 and the second upper bracket 64 are all nestled within the cavity C between the upper section 56a and the lower section 56c and between the outboard surface 48 of the front side member 20 and the outboard section 56b of the outboard bracket 56, as shown in cross-section in FIGS. 15, 16 and 17. More specifically, the lower main bracket 58, the lower reinforcement bracket 60, the first upper bracket 62 and the second upper bracket 64 are all arranged within the cavity C and define a honey-comb-like or labyrinth-like assembly that reinforces the outboard bracket 56 against deformation in response to an off-center impact event.

Figure 12:
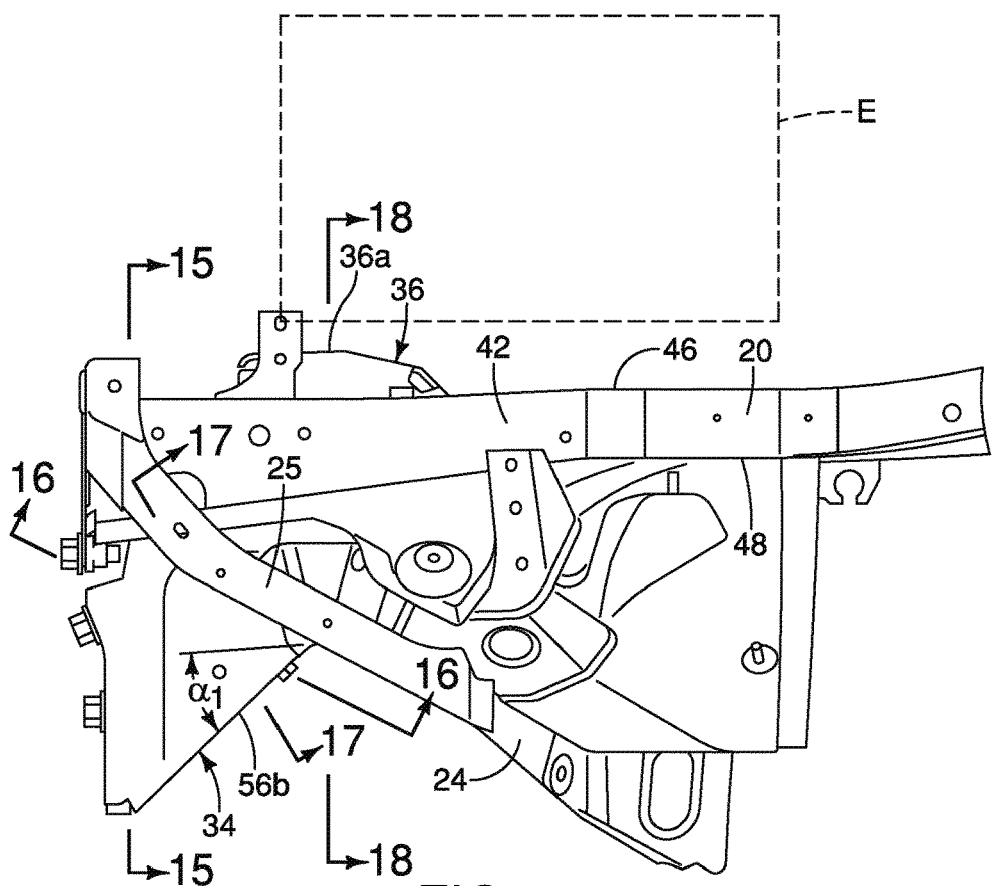
FIG. 12 is a top view of the front corner of the front end assembly showing the front side member, the hood ledge, the brace, the push-off structure, the engine (in phantom) and the inboard push structure in accordance with the exemplary embodiment.
Figure 13:
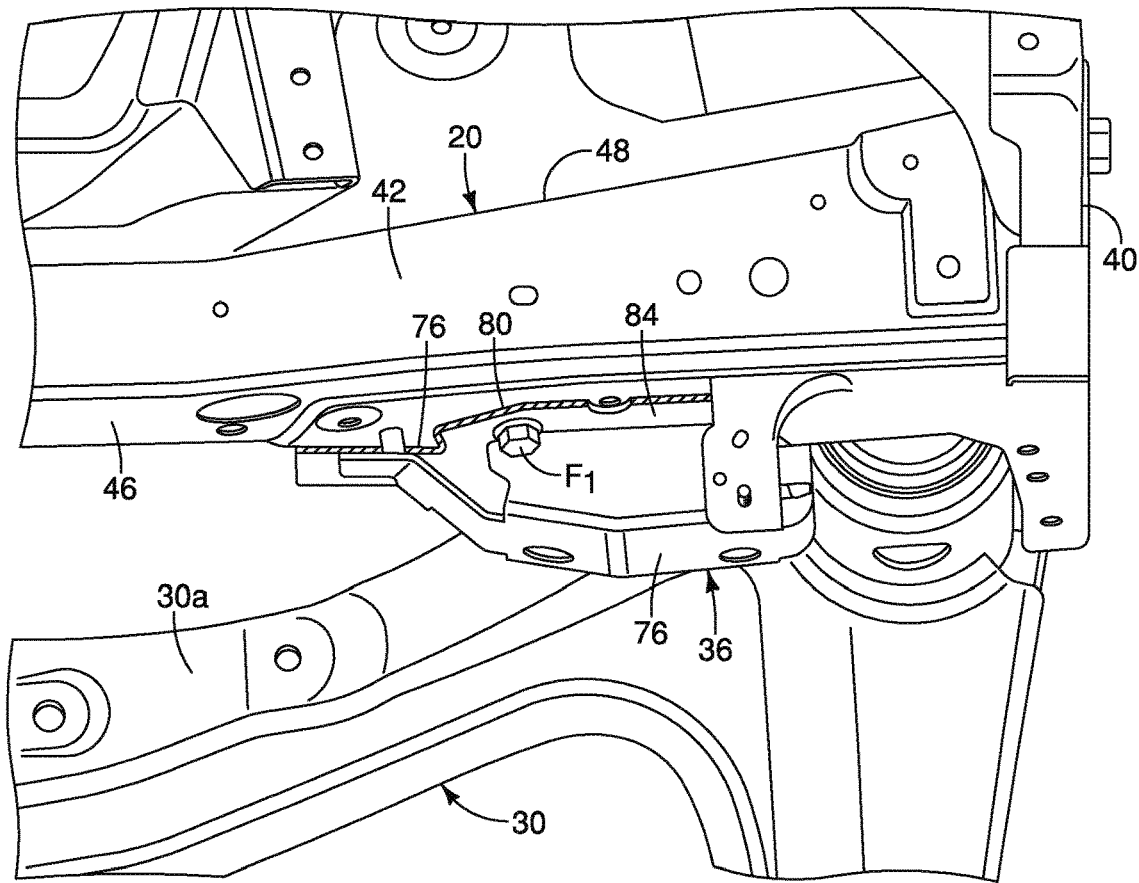
FIG. 13 is a perspective top view of the front corner of the front end assembly showing the front side member, a portion of the engine cradle and the inboard push structure in accordance with the exemplary embodiment.

The outboard section 56b (also referred to as an outboard wall of the outboard bracket 56) has a rear end 56f and a forward end 56g. The rear end 56f contacts a portion of the outboard surface 48 of the front side member 20 and the forward end 56g is spaced apart from the front end surface 40 of the front side member 20. The outboard surface 40 of the front side member 20 is such that the outboard section 56b (the outboard wall of the outboard bracket 56) and the outboard surface 48 of the front side member 20 define an acute angle $\alpha_1$ therebetween that is greater than 25 degrees, as shown in FIG. 12.

The lower main bracket 58 and first upper bracket 62 are welded to one another and are arranged within the cavity C such that the first upper bracket 62 is located above the lower main bracket 58, as shown in FIGS. 15, 16 and 17. The lower main bracket 58 and the lower reinforcement bracket 60 are welded to one another and are positioned within the cavity C of the outboard bracket 56 such that the lower reinforcing bracket 60 is positioned inboard of a vertical part of the lower main bracket 58.

The lower reinforcement bracket 60 is located below and extends parallel with the second upper bracket 64. The first upper bracket 62 and the second upper bracket 64 are positioned within the cavity C of the outboard bracket 56 with the second upper bracket 64 being inboard of the first upper bracket 62. Contacting areas of the plurality of brackets are welded to one another where possible forming a solid structure that can resist deformation. Further, the lower reinforcement bracket 60 is welded to the lower main bracket 58, and, the lower main bracket 58 is welded to the first upper bracket 62, the second upper bracket 64 and the outboard bracket 56.

Figure 3:
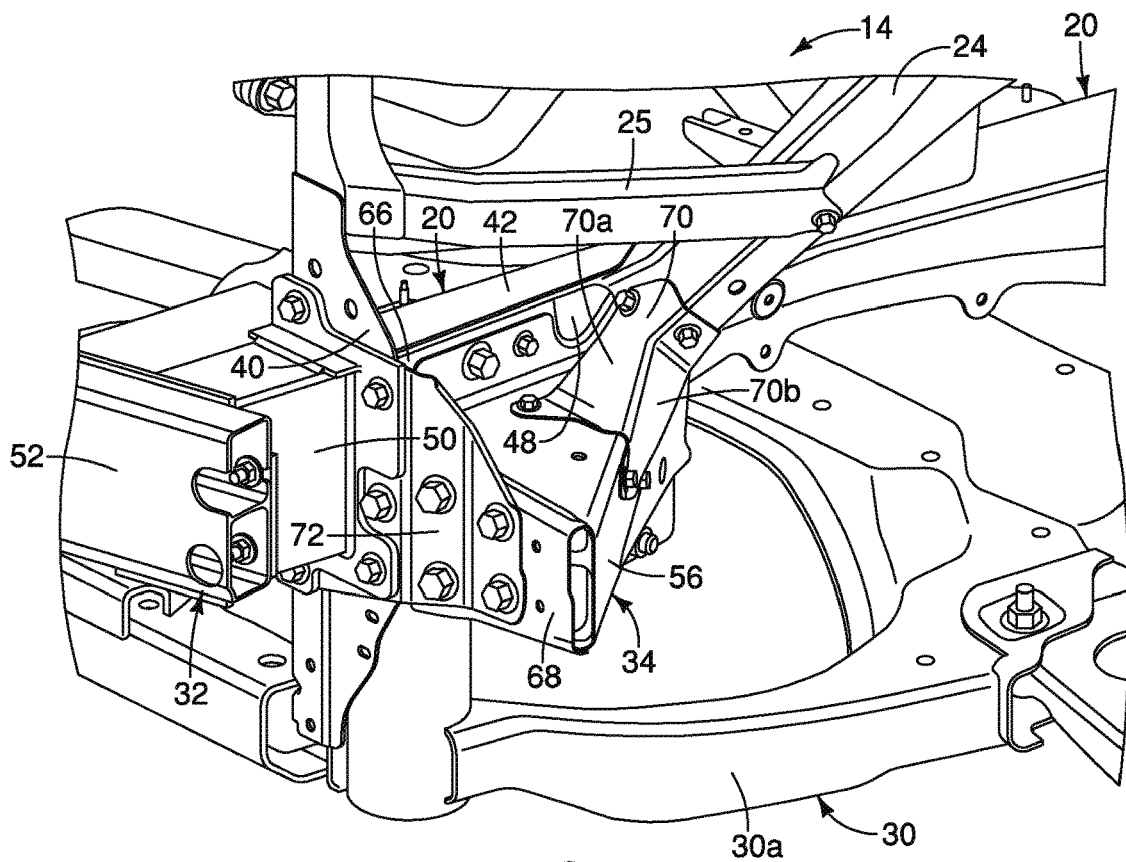
FIG. 3 is a perspective view of one front corner of the front end assembly showing a front side member, a portion of the engine cradle and an outboard push-off structure attached to the front side member in accordance with the exemplary embodiment.
Figure 4:
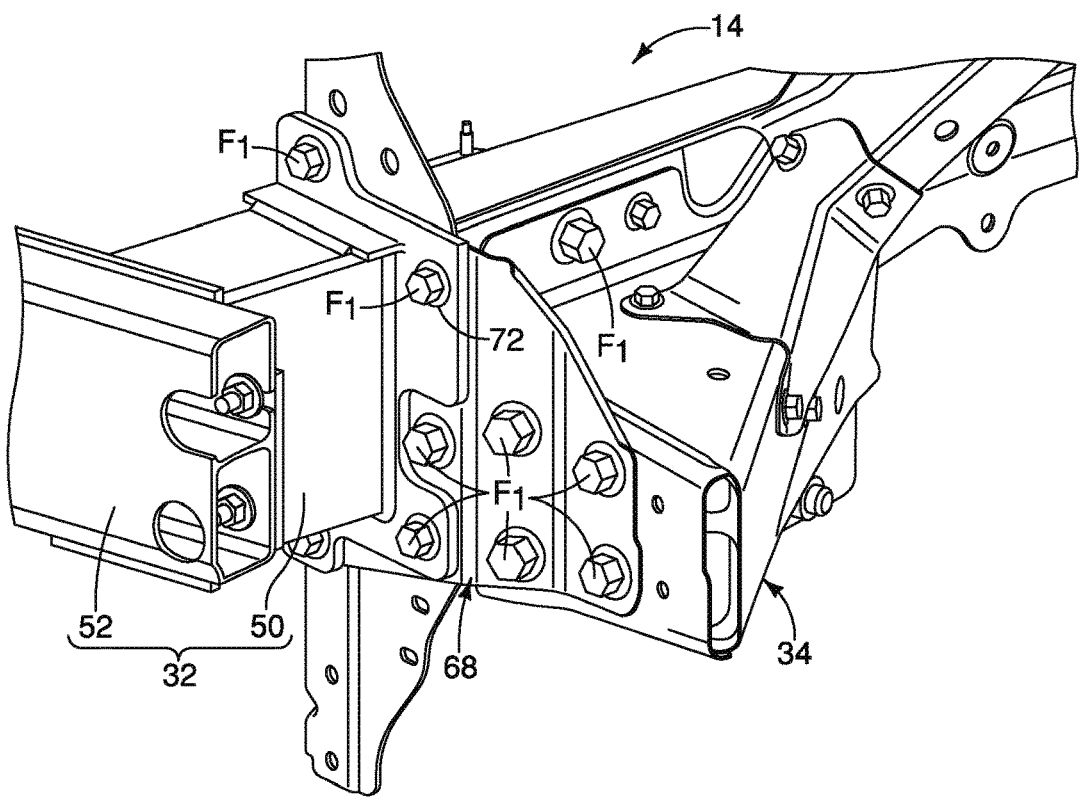
FIG. 4 is another perspective view of the front corner of the front end assembly showing the push-off structure attached to an outboard surface of the front side member, a bumper assembly attached to the front side member and a hood ledge attached to the push-off structure via a joint bracket in accordance with the exemplary embodiment.
Figure 5:
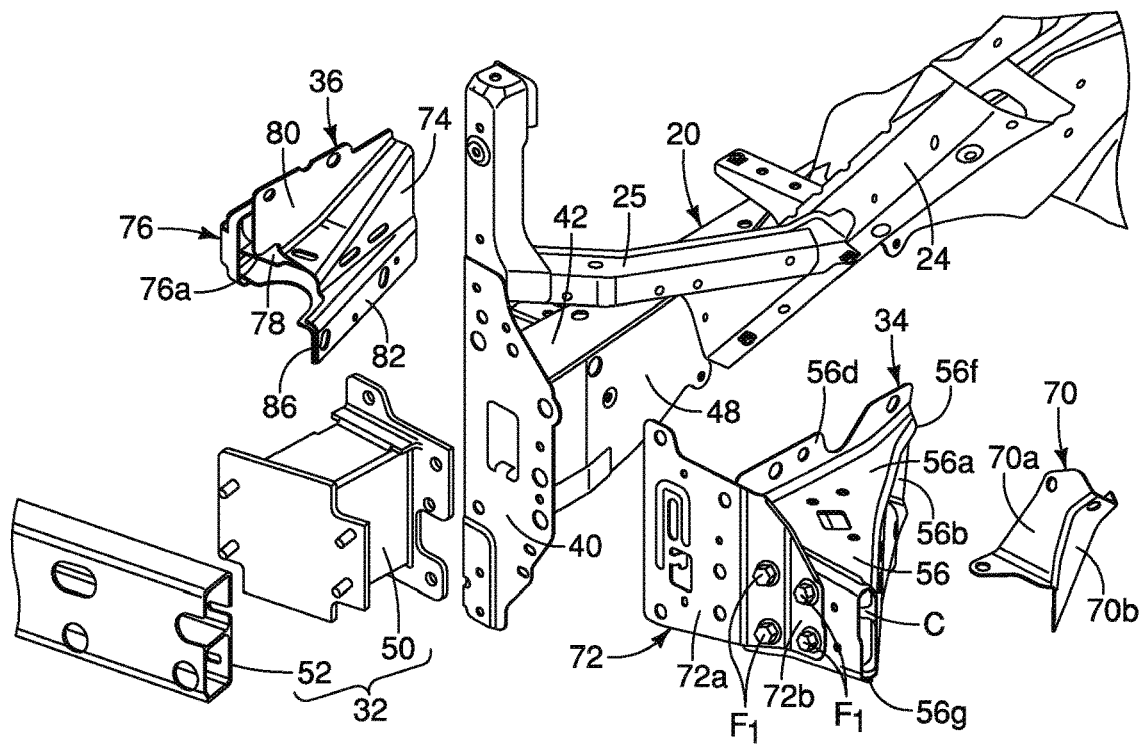
FIG. 5 is an exploded perspective view of the front corner of the front end assembly showing the front side member, the (outboard) push-off structure, a portion of the bumper assembly and an inboard push structure that attaches to the front side member in accordance with the exemplary embodiment.
Figure 6:
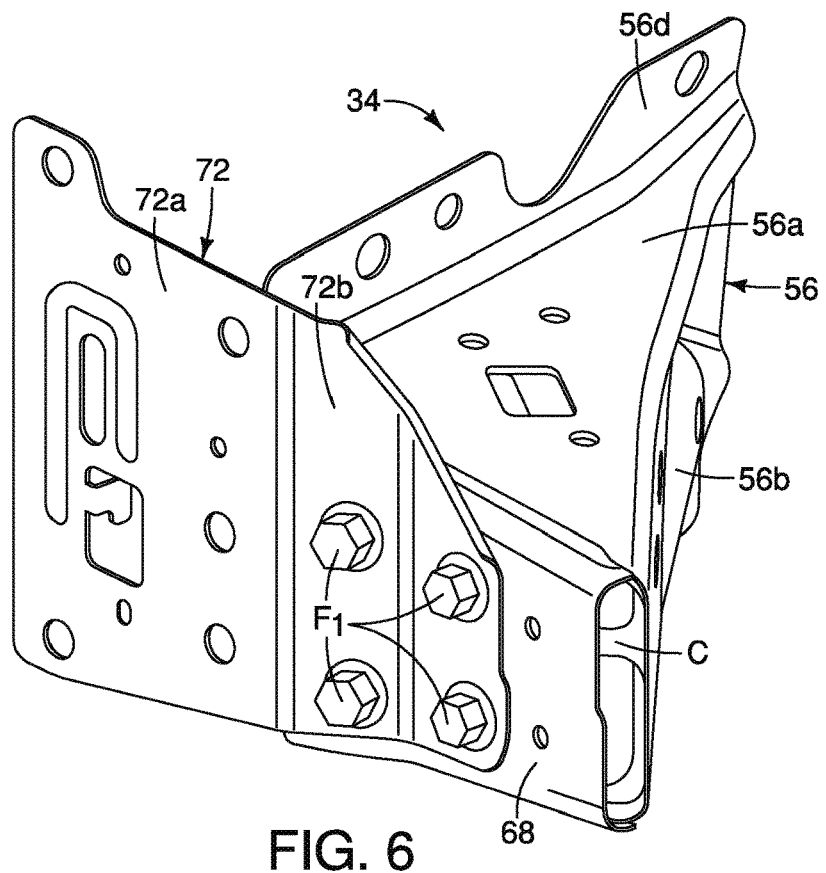
FIG. 6 is a perspective view of the push-off structure and a front bracket thereof shown removed from the vehicle body structure of the vehicle in accordance with the exemplary embodiment.

The inboard bracket 66 is attached to both the outboard surface 48 of the front side member 20 and the upper flange 56d of the outboard bracket 56 of the push-off structure 34 via fasteners $F_1$, as shown in FIGS. 3 and 4. In other words, the inboard bracket 66 is sandwiched between the outboard surface 48 of the front side member 20 and the upper flange 56d of the outboard bracket 56 of the push-off structure 34.

The forward bracket 68 is fixedly attached (via, for example, welding techniques) to the upper and lower sections 56a and 56c of the outboard bracket 56 covering an opening defined by the outboard bracket 56 exposing the cavity C. In other words, attachment of the forward bracket 68 at least partially covers and conceals the cavity C and forward edges of the lower main bracket 58, the lower reinforcement bracket 60, the first upper bracket 62 and the second upper bracket 64, as shown in FIGS. 3-6.

The push-off structure 34 further includes a joint bracket 70 that is attached to both a forward end of the hood ledge 24 and a mid-portion the outboard bracket 56 of the push-off structure 34. More specifically, the joint bracket 70 has a sloping portion 70a and a vertically downwardly extending portion 70b. The sloping portion 70a is attached via fasteners $F_1$ to both a sloping portion of the hood ledge 24 and the upper section 56a of the outboard bracket 56. The vertically downwardly extending portion 70b of the joint bracket 70 is attached via fasteners $F_1$ to the outboard section 56b, as shown in FIGS. 3 and 4.

The vehicle front end assembly 14 further includes a front bracket 72 that has a first portion 72a and a second portion 72b. The first portion 72a is attached to the front end surface 40 of the front side member 20 along with the front bumper stay 50 of the bumper assembly 32 via fasteners $F_1$. The second portion 72b is attached to a forward surface of the forward bracket 68 of the push-off structure 34 via fasteners $F_1$. The first portion 72a of the front bracket 72 is basically a first planar portion and the second portion 72b of the front bracket 72 is basically a second planar portion that is off-set from the first portion 72a such that they are not co-planar. The first portion 72a of the front bracket 72 covers at least most (part) or all of the front end surface 40 of the front side member 20 and the second portion 72b of the front bracket 72 covers at least part or all of the front surface (forward surface) of the forward bracket 68 the push-off structure 34.

The lower main bracket 58, the lower reinforcement bracket 60, the first upper bracket 62 and the second upper bracket 64 of the push-off structures 34 are arranged with in the cavity C of the outboard bracket 56 such that they extend close to or approximately perpendicular to the forward bracket 68 and the second portion 72b of the front bracket 72. In the event of an impact event occurring against the second portion 72b of the front bracket 72, the lower main bracket 58, the lower reinforcement bracket 60, the first upper bracket 62 and the second upper bracket 64 are oriented to reinforce the forward bracket 68 and the push-off structure 34 such that the impacting force is at least partially transmitted through the push-off structure 34 to the front side member 20.

Figure 9:
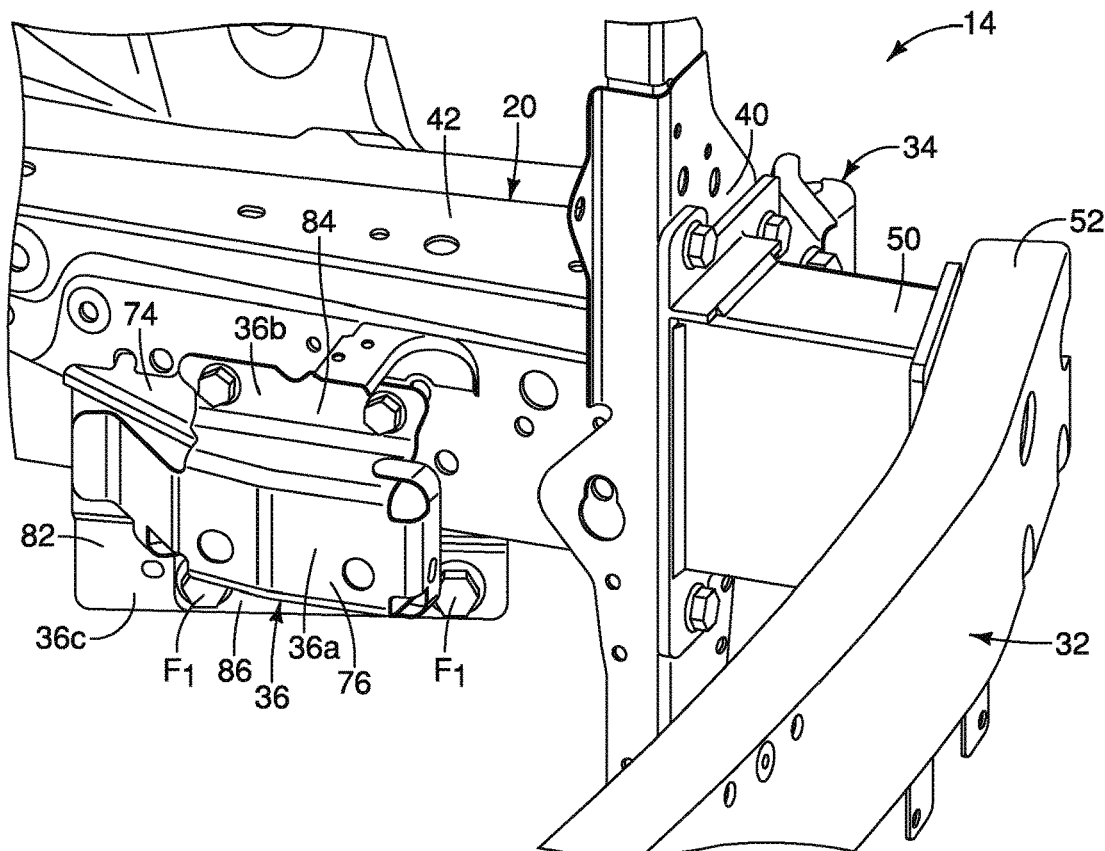
FIG. 9 is a perspective view of the front end structure showing an inboard surface of the front side member, the inboard push structure attached to the inboard surface of the front side member, a lower flange of the inboard push structure attached to an lower flange of the push-off structure 34 and the bumper assembly attached to the front end surface of the front side member and a portion of the front bracket in accordance with the exemplary embodiment.
Figure 10:
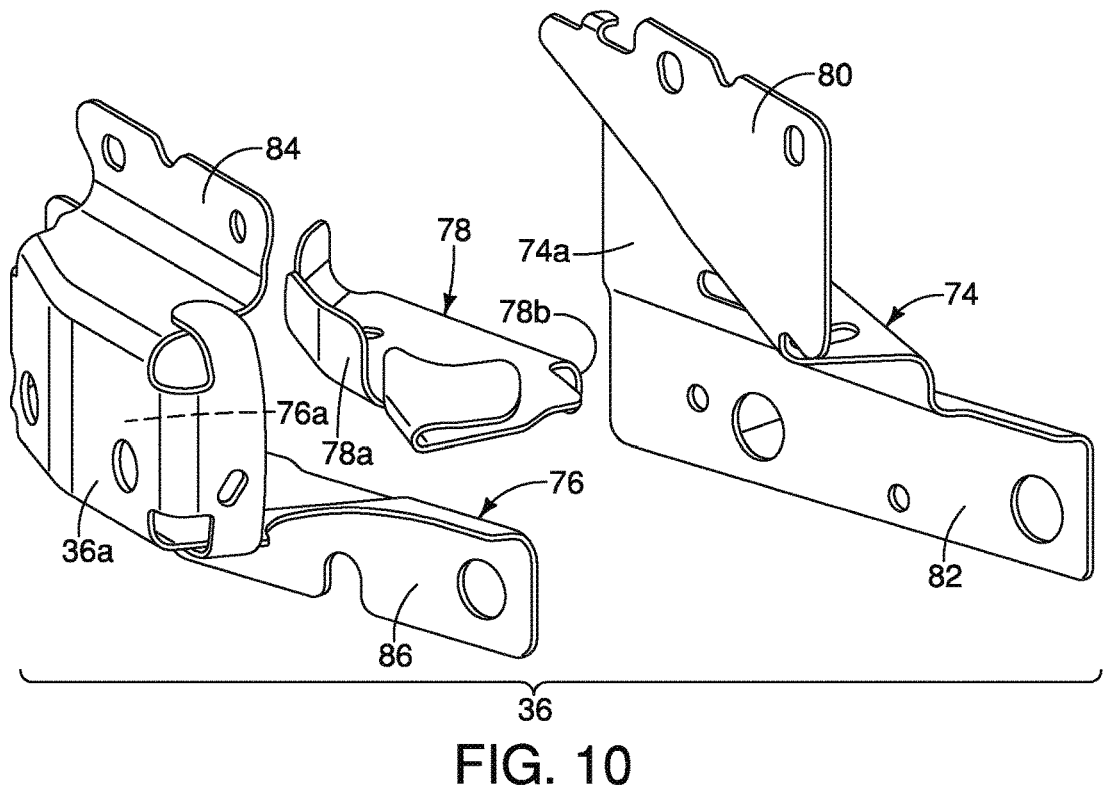
FIG. 10 is an exploded view of the inboard push structure shown removed from the vehicle body structure in accordance with the exemplary embodiment.
Figure 11:
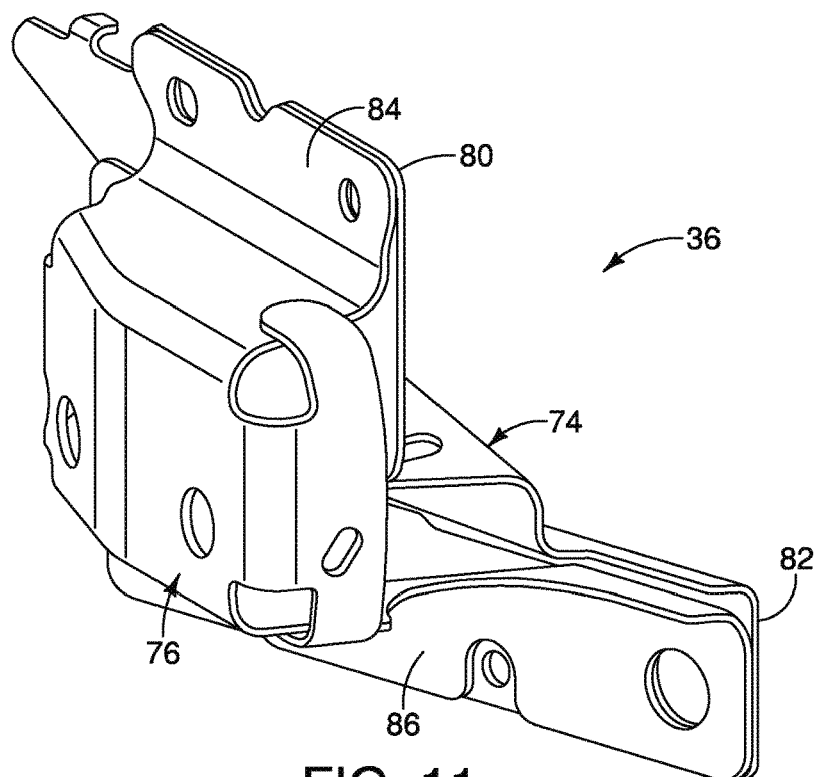
FIG. 11 is a perspective view of the inboard push structure shown removed from the vehicle body structure in accordance with the exemplary embodiment.
Figure 14:
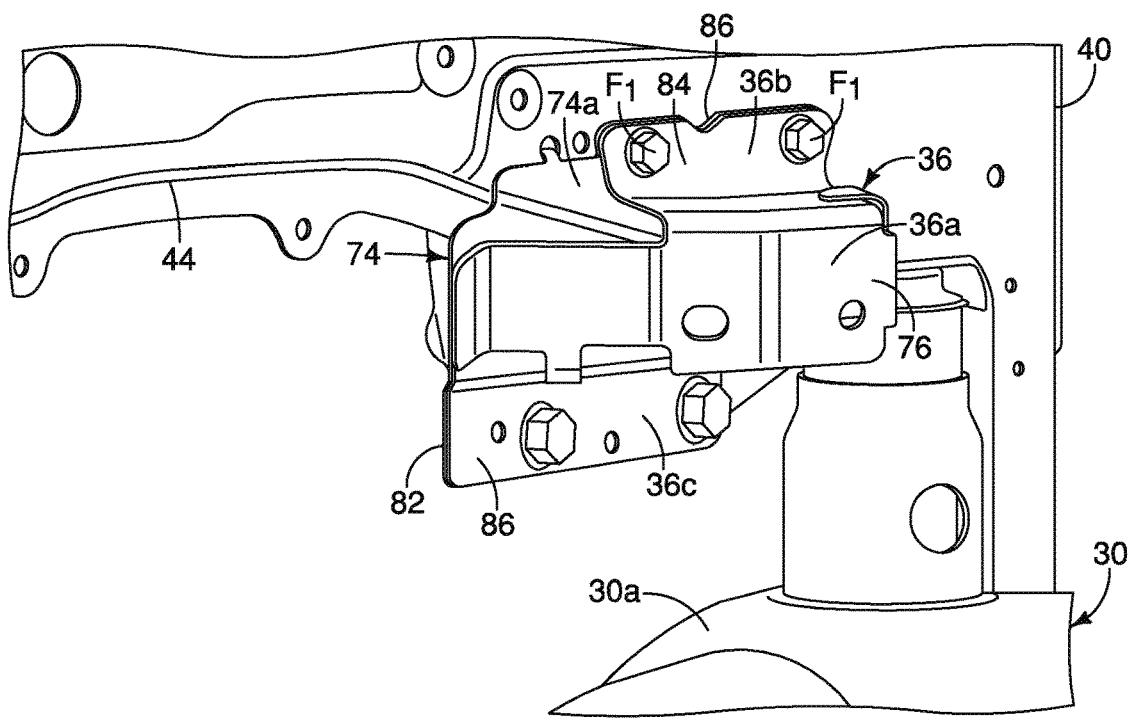
FIG. 14 is a perspective view of the front corner of the front end assembly showing the front side member, a portion of the engine cradle and the inboard push structure attached to the push-off structure in accordance with the exemplary embodiment.

A description is now provided for the inboard push structure 36 with specific reference to FIGS. 6, 9-15 and 18. As shown in FIGS. 9 and 14, the inboard push structure 36 has an inboard surface 36a, an upper portion 36b and a lower portion 36c. The upper portion 36b is attached to the inboard surface 46 of the front side member 20 via fasteners $F_1$, as shown in FIGS. 9, 13-15 and 18. The lower portion 46c extends downward below the lower surface 44 of the front side member 20. The inboard surface 36a faces the engine E proximate the lateral side portion 30a of the engine cradle 30.

The inboard push structure 36 is assembled from an outboard bracket 74, an inboard bracket 76 and a reinforcement bracket 78. The reinforcement bracket 78 is located within a hollow or cavity defined between the outboard bracket 74 and the inboard bracket 76. Further, the reinforcement bracket 78 extends between the outboard bracket 74 and the inboard bracket 76. The inboard surface 36a of the inboard push structure 36 is defined on a portion of the inboard bracket 76, the inboard surface 36a facing the engine E.

Figure 18:
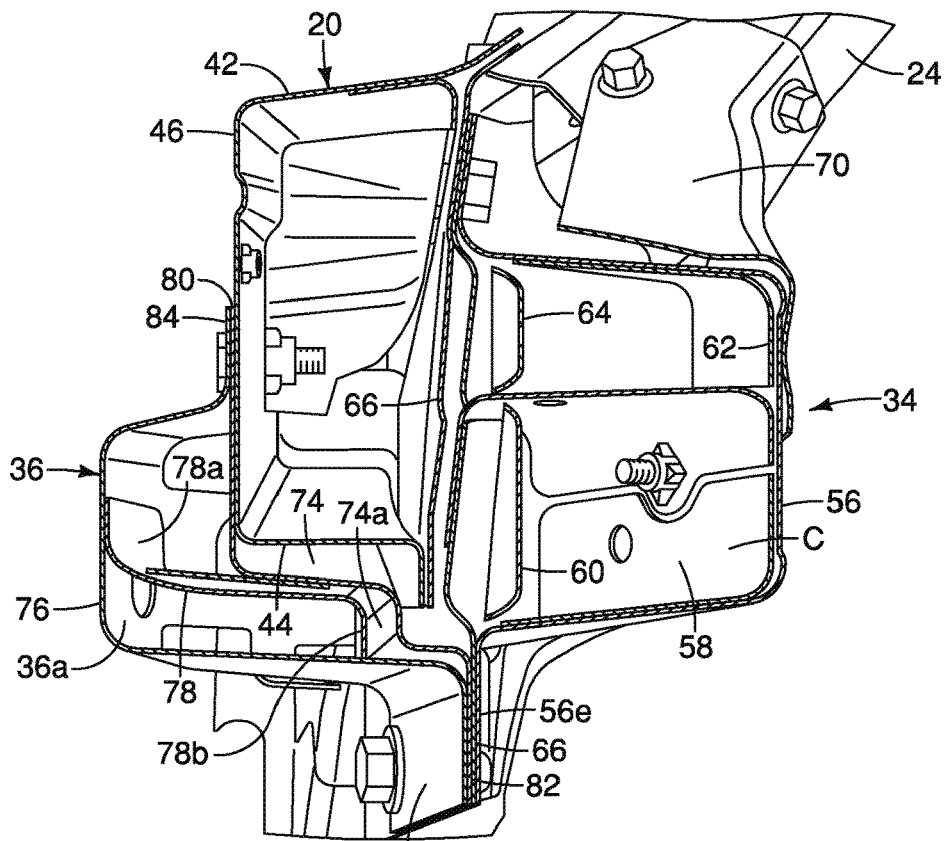
FIG. 18 is yet another cross-sectional view taken along the line 18-18 in FIG. 12 showing the various brackets of the push-off structure welded to one another defining the honeycomb-like or labyrinth-like internal assembly of the push-off structure within the cavity defined by an outboard bracket of the push-off structure, and, the various brackets that define the inboard push structure in accordance with the exemplary embodiment.

As shown in FIG. 18, the reinforcement bracket 78 has a gusset or flange 78a that is welded to an outboard surface 76a of the inboard bracket 76 and a gusset or flange 78b that is welded or otherwise fixedly attached to an inboard surface 74a of the outboard bracket 74.

The outboard bracket 74 of the inboard push structure 36 has an upper flange 80 and a lower flange 82. The inboard bracket 76 of the inboard push structure 36 has an upper flange 84 and a lower flange 86. The lower portion 36c of the inboard push structure 36 is at least partially defined by the lower flange 82 of the outboard bracket 74 and the lower flange 86 of the inboard bracket 76. The lower portion 36c of the inboard push structure 36 is angularly offset from the upper flanges 80 and 84 of each of the outboard and inboard brackets 74 and 76.

As shown in FIGS. 9, 13-15 and 18, the upper flange 80 of the outboard bracket 74 and the upper flange 84 of the inboard bracket 76 of the inboard push structure 36 are fixed via fasteners F1 to the inboard surface 46 of the front side member 20.

As shown in FIGS. 9, 14-15 and 17-18, the lower end of the inboard bracket 66 and the lower flange 56e of the outboard bracket 56 of the (outboard) push-off structure 34 extend downward to a location below the lower surface 44 of the front side member 20.

As shown in FIGS. 14, 15 and 18, the lower flange 82 of the outboard bracket 74 and the lower flange 86 inboard bracket 76 of the inboard push structure 36 also extend downward to a location below the lower surface 44 of the front side member 20. Further, the lower flange 82 of the outboard bracket 74 and the lower flange 86 inboard bracket 76 of the inboard push structure 36 are attached via fasteners to the lower end of the inboard bracket 66 and the lower flange 56e of the outboard bracket 56 of the push-off structure 34.

Hence, the inboard push structure 36 is fixedly attached to both the front side member 20 and the push-off structure 34.

Further, a majority or main portion of the outboard push-off structure 34 (defined by the outboard section 56b of the outboard bracket 56) extends outboard from the outboard surface 46 of the front side member 20.

The configurations of the push-off structure 34 and the inboard push structure 36 provide many features to the vehicle 10.

For example, since the outboard push-off structure 34 extends outboard of the front side member 20, in response to an off-center impact event where impacting forces are applied to the front bracket 70 and the outboard push-off structure 34, a portion of impacting forces from the impact event are absorbed in part by the outboard push-off structure 34. Further, another portion of the impacting forces are transmitted from the outboard push-off structure 34 to the front side member 20 and the remainder of the vehicle 10. Thus, the outboard push-off structure 34 can be employed without the inclusion of the inboard push structure 36.

Further, in an embodiment where the inboard push structure 36 and the outboard push-off structure 34, a portion of the impacting forces can possibly deform the front side member 20 causing the inboard push structure 36 to be moved in an inboard direction. Consequently, an inboard surface of the inboard bracket 76 can be moved into contact with the engine E thereby transferring at least a portion of the impacting force to the engine E and the engine cradle 30, thereby disbursing impact forces throughout various areas and structure of the front end assembly 14.

In an embodiment where the inboard push structure 36 is used in the absence of the outboard push-off structure 34, an impact event that deforms the front side member 20 can also cause the inboard push structure 36 to move into contact with the engine E thereby transferring at least a portion of the impacting force to the engine E and the engine cradle 30, thereby disbursing impact forces throughout various areas and structure of the front end assembly 14.

Hence, the outboard push-off structure 34 can be employed with or without the inboard push structure 36. Similarly, the inboard push structure 36 can be employed with or with the outboard push-off structure 34.

The various elements and structure of the vehicle 10 (other than the outboard push-off structure 34 and the inboard push structure 36) can be conventional components that are well known in the art. Since such elements and structure are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle front end assembly. Accordingly, these terms, as utilized to describe the present invention should be interpreted relative to a vehicle equipped with the vehicle front end assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end assembly, comprising:
a vehicle frame structure having a front side member and a dashwall, the front side member extending forward from the dashwall and a passenger compartment defined rearward of the dashwall, the front side member having a front end surface, an upper surface, a lower surface, an inboard surface that extends from the upper surface to the lower surface and an outboard surface that extends from the upper surface to the lower surface;
an engine cradle attached to the front side member with a lateral side portion of the engine cradle being located beneath and spaced apart from the lower surface of the front side member;
an engine installed to the engine cradle with a portion of the engine extending upward from the engine cradle adjacent to the inboard surface of the front side member; and
an inboard push structure having an inboard surface, an upper portion and a lower portion, the upper portion being attached to the inboard surface of the front side member, the lower portion extending downward below the lower surface of the front side member and the inboard surface facing the engine proximate the lateral portion of the lateral side portion of the engine cradle, the inboard push structure including an outboard bracket, an inboard bracket and a reinforcement bracket that extends between the outboard bracket and the inboard bracket.

2. The vehicle front end assembly according to claim 1, wherein the inboard bracket of the inboard push structure has an inboard surface that faces the engine.

3. The vehicle front end assembly according to claim 1, wherein
the reinforcement bracket has a gusset that is welded to an outboard surface of the inboard bracket and a flange that is fixedly attached to an inboard surface of the outboard bracket.

4. The vehicle front end assembly according to claim 1, wherein
the outboard bracket of the inboard push structure has an upper flange and a lower flange, the inboard bracket of the inboard push structure has an upper flange and a lower flange, with the lower portion of the inboard push structure being defined by the lower flange of the outboard bracket and the lower flange of the inboard bracket, the lower portion of the inboard push structure being angularly offset from the upper flanges of each of the outboard and inboard brackets.

5. The vehicle front end assembly according to claim 4, further comprising
an outboard push-off structure attached to the outboard surface of the front side member adjacent to the front end surface of the front side member, with a main portion of the outboard push-off structure extending outboard from the outboard surface and a lower portion of the outboard push-off structure extending downward below the lower surface of the front side member with the lower portion of the outboard push-off structure being fixed to the lower portion of the inboard push structure.

6. A vehicle front end assembly, further comprising
a vehicle frame structure having a front side member and a dashwall, the front side member extending forward from the dashwall and a passenger compartment defined rearward of the dashwall, the front side member having a front end surface, an upper surface, a lower surface, an inboard surface that extends from the upper surface to the lower surface and an outboard surface that extends from the upper surface to the lower surface;
an engine cradle attached to the front side member with a lateral side portion of the engine cradle being located beneath and spaced apart from the lower surface of the front side member;
an engine installed to the engine cradle with a portion of the engine extending upward from the engine cradle adjacent to the inboard surface of the front side member;
an inboard push structure having an inboard surface, an upper portion and a lower portion, the upper portion being attached to the inboard surface of the front side member, the lower portion extending downward below the lower surface of the front side member and the inboard surface facing the engine proximate the lateral portion of the lateral side portion of the engine cradle; and
an outboard push-off structure attached to the outboard surface of the front side member adjacent to the front end surface of the front side member, with a main portion of the outboard push-off structure extending outboard from the outboard surface and a lower portion of the outboard push-off structure extending downward below the lower surface of the front side member with the lower portion being fixed to the lower portion of the inboard push structure.

7. The vehicle front end assembly according to claim 6, further comprising
a hood ledge that extends from the front side member proximate the front end surface upward and rearward toward an upper portion of the dashwall.

8. The vehicle front end assembly according to claim 7, further comprising
a joint bracket attached to both a forward end of the hood ledge and the outboard push-off structure.

9. The vehicle front end assembly according to claim 6, further comprising
a front bracket having a first portion attached to the front end surface of the front side member and a second portion attached to a front surface of the outboard push-off structure.

10. The vehicle front end assembly according to claim 9, wherein
the first portion of the front bracket has a first planar portion and the second portion of the front bracket has a second planar portion that are off-set from one another such that they are not co-planar.

11. The vehicle front end assembly according to claim 10, wherein
the first portion of the front bracket covers part of the front end surface of the front side member and the second portion of the front bracket covers part of the front surface of the outboard push-off structure.

12. The vehicle front end assembly according to claim 9, further comprising a front bumper stay configured to support a front bumper assembly, the front bumper stay being fixed to a forward facing surface of the first portion of the front bracket.

13. The vehicle front end assembly according to claim 6, wherein
the outboard push-off structure includes an outboard bracket, a lower main bracket, a lower reinforcement bracket, a first upper bracket, a second upper bracket, an inboard bracket and a forward bracket.

14. The vehicle front end assembly according to claim 13, wherein
the outboard bracket has an upper flange fixed to the front side member and a lower flange that extends below the front side member, and an outboard wall that is vertically oriented with a cavity being defined between the upper and lower flanges.

15. The vehicle front end assembly according to claim 14, wherein
the lower main bracket, the lower reinforcement bracket, the first upper bracket and the second upper bracket are all arranged within the cavity of the outboard bracket and define a labyrinth-like assembly that reinforces the outboard bracket against deformation in response to an off-center impact event.

16. The vehicle front end assembly according to claim 15, wherein
the outboard wall of the outboard bracket has a rear end and a forward end, the rear end contacting a portion of the outboard surface of the front side member and the forward end of the outboard wall is spaced apart from the front end surface and the outboard surface of the front side member such that the outboard wall of the outboard bracket and the outboard surface of the front side member define an acute angle therebetween that is greater than 25 degrees.

17. The vehicle front end assembly according to claim 15, wherein
the lower main bracket and first upper bracket are arranged within the cavity such that the first upper bracket is located above the lower main bracket,
the lower reinforcement bracket is positioned within the cavity of the outboard bracket such that the lower reinforcing bracket is positioned inboard of a vertical part of the lower main bracket, and
the lower reinforcement bracket is located below and extends parallel with the second upper bracket.

18. The vehicle front end assembly according to claim 17, wherein
the first upper bracket and the second upper bracket are positioned within the cavity of the outboard bracket with the second upper bracket being inboard of the first upper bracket,
the lower reinforcement bracket is welded to both the lower main bracket, and
the lower main bracket is welded to the first upper bracket, the second upper bracket and the outboard bracket.

* * * * *